Figures 1, 2:
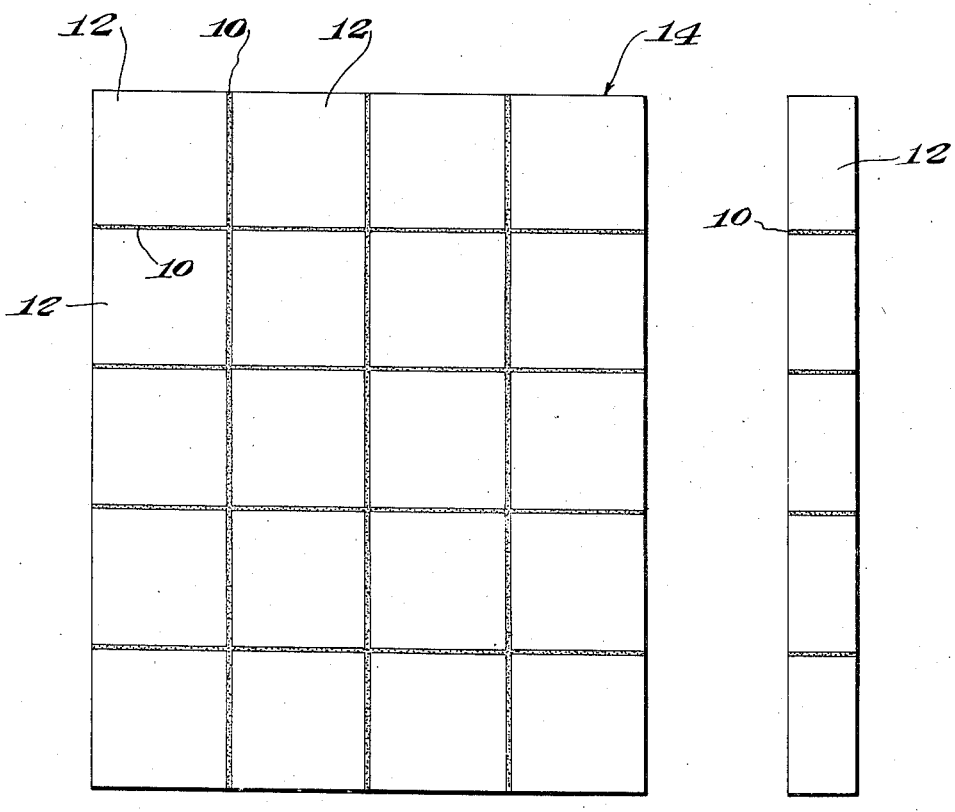

July 4, 1939.   D. S. HUBBELL   2,164,457
COMPOSITE STRUCTURE AND METHOD OF MAKING THE SAME Filed Feb. 5, 1937

INVENTOR
Dean S
BY
ATT

Patented July 4, 1939

2,164,457

UNITED STATES PATENT OFFICE 2,164,457

COMPOSITE STRUCTURE AND METHOD OF MAKING THE SAME

Dean S. Hubbell, Pittsburgh, Pa., assignor to H. H. Robertson Company, Pittsburgh, Pa., a corporation of Pennsylvania Application February 5, 1937, Serial No. 124,347

2 Claims. (Cl. 49—81)

This invention relates to a composite structure and method of making the same.

The object of the invention is to produce a novel composite structure embodying a preformed glass article and in which the elements of the structure are secured together by a cementitious material producing joints of permanent strength and preferably extremely thin character.

A further object of the invention is to provide a novel glass structure comprising a plurality of set-up glass bricks, and in which the individual bricks are joined together by a novel cementitious material whereby extremely strong joints of a thin character and having particularly good adhesion may be obtained.

A still further object of the invention is to provide a novel method of producing a composite glass structure which lends itself to the production of a structure having extremely thin and strong joints between the indivdual elements thereof.

In the drawing, Fig. 1 is a front elevation of a composite structure embodying the present invention; and Fig. 2 is an end view of the structure shown in Fig. 1.

Prior to the present invention, it has been the practice in producing composite glass structures such as glass walls, and also composite structures embodying glass adhesively affixed to other material, to set up the individual elements of the composite structure utilizing ordinary mortars embodying Portland and similar cementitious material or utilizing organic materials such as resins, or combinations of organic materials and Portland cement. In the latter case, the organic materials such as rubber and resins have been applied to the glass elements in order to increase the bond between the glass and the Portland or other cement.

In practice when mortars are used in producing a composite structure of the character above referred to that consist of Portland or other hydraulic cements the joints must be at least one quarter inch in thickness and preferably more so that the mortar will harden properly. Such thick joints are conspicuous in an otherwise transparent or translucent wall or article and detract from its apperance. A further limitation to the use of these mortars is their poor adhesion to glass and to many other materials which it may be desired to join to glass.

On the other hand, organic cements such as those incorporating rubber or a resin, although they will adhere to glass and other material and, when used as a film over glass, improve the bond between it and the ordinary cement mortars, are subject to deterioration upon exposure to sun and the natural weathering agencies with the result that their strength and adhesiveness is reduced, destroying the utility of the glass wall or other composite structure.

According to the present invention, a copper-bearing magnesium oxychloride cement, herein indicated at 10, and of the type forming the subject matter of my United States Letters Patent Nos. 2,058,984; 2,058,985; 2,058,986; 2,058,987 has been found to possess the ability of joining together glass elements 12 to produce a composite glass structure 14 and further to produce a composite structure embodying glass elements or elements composed of other materials such as masonry, wood, ceramic materials, and the like. Composite glass structures utilizing this cement as a mortar have been produced in which the mortar is of paper thinness between the individual elements of the structure, and at the same time such joints have possessed remarkable strength and superior adhesive characteristics.

Beams consisting of solid glass bricks, joined together with thin films of mortar comprising my patented copper bearing magnesium oxychloride cement above referred to, show a modulus of rupture of from 700 to 900 lbs. per square inch—a value many times greater than that obtainable with beams laid up with ordinary Portland cement mortar.

In addition to its ability to joint glass to glass, the copper bearing magnesium oxychloride cements above referred to form strong joints between glass and a great variety of other materials and therefore make possible composite articles comprising useful combinations of materials such as glass with other ceramic or masonry materials, glass with wood articles or compositions and glass with organic or mineral fibres. The ability to secure such unions permits the joining of building units or other members comprising these materials.

The copper bearing magnesium oxychloride cements above referred to possess definite advantages as compared with ordinary magnesium oxychloride cement mortars, among which may be mentioned that they are not damaged by water or weathering and not subject to destructive increases in volume.

In accordance with the present method, the cementitious material may be made up or used of a consistency such as to permit the glass bricks or other elements to be dipped therein to apply the cement thereto. The coated bricks or other elements may then be directly set up without the use of additional quantities of cement as contributing to the economy of producton of the composite structure and avoiding the necessity of troweling and other operations. In case it is desirable to follow present masonry practice, the consistency of the cement will be comparable to that now employed in producing a composite structure embodying glass elements, and I have found it desirable to first roughen the glass surface to which the cement is to adhere as by sand blasting or in other suitable manner.

In order to produce a copper bearing magnesium oxychloride cement suitable for use in producing the present composite glass structure, commercial magnesium oxychloride cement obtainable upon the market or produced according to known processes is, as set forth in my patents above referred to, treated to incorporate in it finely divided copper or finely divided cuprous oxide in an amount less than the amount of the cement and preferably from 3 to 10%.

As used throughout the claims, the term "copper bearing magnesium oxychloride cement" is intended to define a magnesium oxychloride cement containing either finely divided copper or finely divided cuprous oxide in an amount less than the amount of the cement.

Having thus described the invention, what is claimed is:

1. The method of producing a composite glass structure which comprises forming the copper bearing magnesium oxychloride cement of a substantially fluid consistency, dipping a plurality of glass elements therein and immediately thereafter setting up the glass elements to form the composite glass structure whereby the adhering cement forms a thin joint between the elements.

2. The method of forming a composite glass structure which consists in forming a copper bearing magnesium oxychloride cement of a substantially fluid consistency, roughening the surfaces of a plurality of glass elements and then dipping the glass elements into the fluid cement and immediately thereafter setting up the glass elements to form the composite glass structure whereby the adhering cement forms a thin joint between said glass elements.

DEAN S. HUBBELL.